(12) United States Patent
Kashyap

(10) Patent No.: US 8,627,125 B2
(45) Date of Patent: Jan. 7, 2014

(54) CONTEXT SENSITIVE POWER MANAGEMENT FOR A RESOURCE

(75) Inventor: Anand Kashyap, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 425 days.

(21) Appl. No.: 13/081,917

(22) Filed: Apr. 7, 2011

(65) Prior Publication Data

US 2012/0260112 A1  Oct. 11, 2012

(51) Int. Cl.
*G06F 1/26* (2006.01)
*G06F 1/00* (2006.01)
*G06F 3/038* (2013.01)
*G08C 17/00* (2006.01)
*H04H 20/71* (2008.01)
*H04M 1/00* (2006.01)
*G01R 21/00* (2006.01)
*G01R 19/00* (2006.01)
*G01C 9/00* (2006.01)
*G06F 17/40* (2006.01)

(52) U.S. Cl.
USPC ........... 713/320; 713/323; 713/340; 345/212; 370/311; 455/3.01; 455/574; 702/60; 702/64; 702/150; 702/187

(58) Field of Classification Search
USPC ........ 713/320, 323, 340; 345/212; 370/13.24, 370/311; 455/3.01, 574; 702/60, 64, 150, 702/187

See application file for complete search history.

(56) References Cited

U.S. PATENT DOCUMENTS

| | | | | |
|---|---|---|---|---|
| 6,885,974 | B2 * | 4/2005 | Holle | 702/182 |
| 7,437,578 | B2 * | 10/2008 | Menzl | 713/300 |
| 7,505,795 | B1 * | 3/2009 | Lim et al. | 455/574 |
| 8,351,892 | B2 * | 1/2013 | Deng | 455/343.5 |

* cited by examiner

*Primary Examiner* — Stefan Stoynov
(74) *Attorney, Agent, or Firm* — Wilmer Cutler Pickering Hale and Dorr LLP

(57) ABSTRACT

Power management systems and methods are presented. In one embodiment, implementation of a method for context specific power management of a resource, comprises: defining a context within which a resource operates, wherein the context is defined by one or more parameters; tracking a usage history of the resource operating within the context to determine passive user feedback related to a plurality of timeout values; and determining a timeout value for a current operation of the resource within the context based on the usage history.

20 Claims, 15 Drawing Sheets

| CONTEXT | CONTEXT DIMENSIONS ||||| USAGE HISTORY || SAMPLED TIME OUT PERIOD |
| --- | --- | --- | --- | --- | --- | --- | --- | --- |
| | TYPE-1 Geo location | TYPE-2 Network | TYPE-3 Power | ••• | TYPE-N Mobility | TOTAL POSITIVE FEEDBACK | TOTAL NEGATIVE FEEDBACK | |
| CONTEXT - 1 | a - 1 | b - 2 | c - 1 | ••• | n - 1 | 20 | 10 | 5 minutes |
| | | | | | | 40 | 10 | 10 minutes |
| CONTEXT - 2 | a - 1 | b - 3 | c - 2 | ••• | n - 1 | 99 | 1 | 20 minutes |
| | | | | | | 45 | 5 | 15 minutes |
| CONTEXT - N | a - 5 | b - 4 | c - 1 | ••• | n - 4 | 97 | 3 | 20 minutes |

| Geo-Location (home, work, other) | Network Identity (VPN, Personal) | Timeout Value | Positive Feedback | Negative Feedback |
|---|---|---|---|---|
| Home | Private | 3 | 10 | 20 |
| Home | Work VPN | 10 | 20 | 10 |
| Work | Work VPN | 15 | 10 | 10 |

791
793
795

● ● ●

| OTHER | Work VPN | N/A | N/A | N/A |
|---|---|---|---|---|

CONTEXT SENSITIVE POWER MANAGEMENT FOR A RESOURCE

BACKGROUND

The display device on a mobile device, such as the computer monitor, or the screen on the laptop or phone, consumes large amounts of power. For instance, in some devices, the display may consume between thirty to forty percent of the total power consumption at any particular point in time. Imagine the power wasted to energize a display when the device is not being actively used. Power mismanagement is amplified on mobile devices which have a finite amount of battery power.

Energy savings can be achieved by turning the display off when a user is not actively interacting with the device. Device interaction is detected by the presence of keyboard or mouse events, for instance. Conversely, device non-interaction is detected by the absence of keyboard or mouse events. In conventional systems, a rudimentary power management system is implemented that defines a single and static timeout period, after which the display of the device is turned off. In essence, the device is monitored for the display timeout period, and if no interaction with the device has occurred during the period, the display is then turned off.

A short and aggressive display timeout can provide large energy savings, but can irritate the user by causing frequent interruptions during periods of light activity. On the other hand, a large and conservative timeout, while causing less annoyance, provides fewer opportunities for energy savings.

The static timeout period is suitable for devices dedicated to a single purpose, such as work computers that operate within a well defined mode of operation on a continual basis. As such, usage of the device is consistent over time, and so a static timeout period on average provides the least amount of annoyance to the user.

However, for devices that operate within dynamically changing environments, the statically defined timeout period is insufficient for implementing a power management scheme. For instance, portable devices are used in various environments where the user places varying demand on the device. For instance, the user may at one time be at home and having the device plugged into an infinite power source, where power management of the device is not so critical. As such, a long timeout period that does not disturb the user would be appropriate. On the other hand, at another time the user may be traveling by air for a long stretch of time, in which power management of the device is very critical. If the timeout period is statically defined for home use of the device, that longer timeout period would be inappropriate for the user when traveling. That is, the user would quickly find out that the battery has drained because the display is constantly operating as if there were an infinite amount of power. Thus, even though the environment within which the device is being used is changing, the static timeout period has not changed with the environment.

SUMMARY

Power management systems and methods of computing resources, such as those found on mobile devices are presented. In one embodiment, computer implementation of a method for context specific power management of a resource, comprises: defining a context within which a resource operates, wherein the context is defined by one or more parameters; tracking a usage history of the resource operating within the context to determine passive user feedback related to a plurality of timeout values; and determining a timeout value for a current operation of the resource within the context based on the usage history. The tracking phase can include: determining a last activity of the resource; conserving power dedicated to the resource when a corresponding timeout period has elapsed in relation to the last activity; tracking an annoyance period after the resource is sleeping; determining a positive feedback when a new activity occurs after the annoyance period has elapsed; and determining a negative feedback when the new activity occurs before the annoyance period has elapsed.

In one embodiment, determining a timeout value phase in the computer implemented method comprises: determining positive feedback in the usage history for a plurality of timeout values; determining negative feedback in the usage history for the plurality of timeout values; determining an annoyance value for each timeout value based on the positive feedback and the negative feedback; and determining a timeout value having an annoyance value between an upper threshold and a lower threshold.

In some embodiments, for a new context, the computer implemented method further comprises: determining a pool of relevant contexts, each of which comprises at least one parameter also common to the new context; determining positive feedback in the usage history for the pool of relevant contexts for a plurality of timeout values; determining negative feedback in the usage history for the pool of relevant contexts for the plurality of timeout values; determining an annoyance value for each timeout value based on the positive feedback and the negative feedback; and determining a timeout value having an annoyance value between an upper threshold and a lower threshold.

In one embodiment, a system includes a tangible, non-transitory computer-readable storage medium having stored thereon, computer-executable instructions that, when executed causes the computer system to perform a method, comprising: defining a context within which a resource operates, wherein the context is defined by one or more parameters; tracking a usage history of the resource operating within the context to determine passive user feedback related to a plurality of timeout values; and determining a timeout value for a current operation of the resource within the context based on the usage history. The tracking phase can include: determining a last activity of the resource; conserving power dedicated to the resource when a corresponding timeout period has elapsed in relation to the last activity; tracking an annoyance period after the resource is sleeping; determining a positive feedback when a new activity occurs after the annoyance period has elapsed; and determining a negative feedback when the new activity occurs before the annoyance period has elapsed. Parameters defining the context includes, but is not limited to, a group consisting of mobility, network connectivity, power, time of day, and geo-location. Power management of a resource may include managing power dedicated to a display in a computing device.

In one embodiment, determining a timeout value phase in the instructed method comprises: determining positive feedback in the usage history for a plurality of timeout values; determining negative feedback in the usage history for the plurality of timeout values; determining an annoyance value for each timeout value based on the positive feedback and the negative feedback; and determining a timeout value having an annoyance value between an upper threshold and a lower threshold. Performing the determination of an annoyance value in the method can include for a given timeout value, determining a percentage of negative feedback within all feedback for the given timeout value.

In some embodiments, for a new context, the instructed method further comprises: determining a pool of relevant contexts, each of which comprises at least one parameter also common to the new context; determining positive feedback in the usage history for the pool of relevant contexts for a plurality of timeout values; determining negative feedback in the usage history for the pool of relevant contexts for the plurality of timeout values; determining an annoyance value for each timeout value based on the positive feedback and the negative feedback; and determining a timeout value having an annoyance value between an upper threshold and a lower threshold.

In one embodiment, a computer system comprises a processor coupled to memory having stored therein instructions that, if executed by the computer system, cause the computer to execute a method comprising: defining a context within which a resource operates, wherein the context is defined by one or more parameters; tracking a usage history of the resource operating within the context to determine passive user feedback related to a plurality of timeout values; and determining a timeout value for a current operation of the resource within the context based on the usage history. The tracking phase can include: determining a last activity of the resource; conserving power dedicated to the resource when a corresponding timeout period has elapsed in relation to the last activity; tracking an annoyance period after the resource is sleeping; determining a positive feedback when a new activity occurs after the annoyance period has elapsed; and determining a negative feedback when the new activity occurs before the annoyance period has elapsed. Parameters defining the context includes, but is not limited to, a group consisting of mobility, network connectivity, power, time of day, and geo-location. Power management of a resource may include managing power dedicated to a display in a computing device.

In one embodiment, determining a timeout value phase in the computer executed method comprises: determining positive feedback in the usage history for a plurality of timeout values; determining negative feedback in the usage history for the plurality of timeout values; determining an annoyance value for each timeout value based on the positive feedback and the negative feedback; and determining a timeout value having an annoyance value between an upper threshold and a lower threshold. Performing the determination of an annoyance value in the method can include for a given timeout value, determining a percentage of negative feedback within all feedback for the given timeout value.

In some embodiments, for a new context, the computer executed method further comprises: determining a pool of relevant contexts, each of which comprises at least one parameter also common to the new context; determining positive feedback in the usage history for the pool of relevant contexts for a plurality of timeout values; determining negative feedback in the usage history for the pool of relevant contexts for the plurality of timeout values; determining an annoyance value for each timeout value based on the positive feedback and the negative feedback; and determining a timeout value having an annoyance value between an upper threshold and a lower threshold.

Thus, according to embodiments of the present disclosure, management of power delivered to a resource of a computing device is implemented through choosing a timeout value which provides the best tradeoff between energy savings and annoyance to the user. The timeout value corresponds to the context in which the device is being used. As such, methods and systems for dynamically adapting resource power management settings based on user context and a history of passive feedback received from the user are disclosed.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 5B is a table illustrating usage history and timeout values for each of a plurality of contexts according to an embodiment of the present disclosure.

FIG. 7C is a chart illustrating timeout values and feedback for one or more contexts for purposes of determining a timeout value for a new context, according to an embodiment of the present disclosure.

DETAILED DESCRIPTION

Figure 1A:
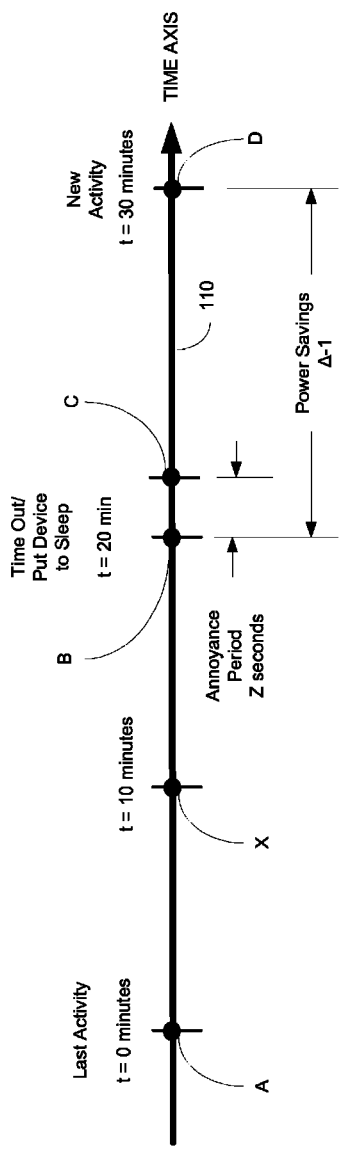
FIG. 1A is a diagram of a timeline illustrating the power savings when a device has a large and conservative timeout value according to an embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "defining," "accessing," "tracking," "storing," "determining," "monitoring," or the like, refer to actions and processes (e.g., flowcharts 400, 600A, 600B, 700A, and 700B of FIGS. 6A, 6B, 7A, and 7B respectively) of a computer system or similar electronic computing device or processor (e.g., system 1010 of FIG. 10). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Accordingly, embodiments according to the present disclosure provide methods and systems to provide context specific power management of computing devices and components or resources associated with those computing devices. Where the discussion below refers to a single application, that discussion can be readily extended to multiple applications. As such, power management settings for a computing device and/or its components or resources of the device are dynamically adapted based on user context and a history of user feedback related to timeout values for a device operating within similar or related contexts.

Embodiments of the present disclosure illustrate "power management" of computing devices and/or elements or resources associated with those devices. As used throughout the application, a resource is a power consuming computing resource. For purposes of ease and illustration, the present disclosure discloses context specific power management within the context of a display in a mobile device. However, description of power management of a display is intended to be representative of power management of any device or resource consuming power, any computing device consuming power, or components, elements, or resources associated with any device or any computing device consuming power.

Resources on a computing device consume a significant amount of power. For instance, a display resource, such as a computer monitor, or the screen on the laptop or phone consumes a large percentage of the total operating power of the corresponding device. Energy saving can be achieved by turning off the display resource when a user is not actively with the specific display, or with the overall device. For instance, a timeout value refers to an amount of time during which if there is no activity detected from the user (e.g., absence of interaction of the user with the device, such as the absence of keyboard or mouse events), then the display is shut off, or put to sleep mode or hibernation.

A large and conservative timeout value typically causes less disturbance to the user. However, a large timeout value, while causing less annoyance, provides fewer opportunities for energy saving. For instance, FIG. 1A is a diagram of a timeline illustrating the power savings when a device has a large timeout value according to an embodiment of the present disclosure. As shown, timeline 110 illustrates points of activity and inactivity with a device. A large timeout value of 20 minutes is associated with the device. At point A, the last activity is shown at time t=0 minutes. At point B, 20 minutes has elapsed from point A without any activity shown by the user with the device. As such, at point B, the display of the device has been put to sleep. Other elements or components of the device may also be put to sleep. At point D, the user interacts with the device, such as activating a button, mouse, keyboard, etc. At point D, new activity is shown to occur at time t=30 minutes. As such, the power savings Δ–1 is approximately 10 minutes, between points B and D.

In FIG. 1A, a variable annoyance period of Z is shown between points B and C, and occurs after the device or resource of the device has been put to sleep. The annoyance period may be set to any time period (e.g., 5 seconds, 30 seconds, 50 seconds). The annoyance period is used to determine whether a user is annoyed with the current timeout value, as will be described, in part, in relation to FIGS. 3, 6A and 6B.

Figure 1B:
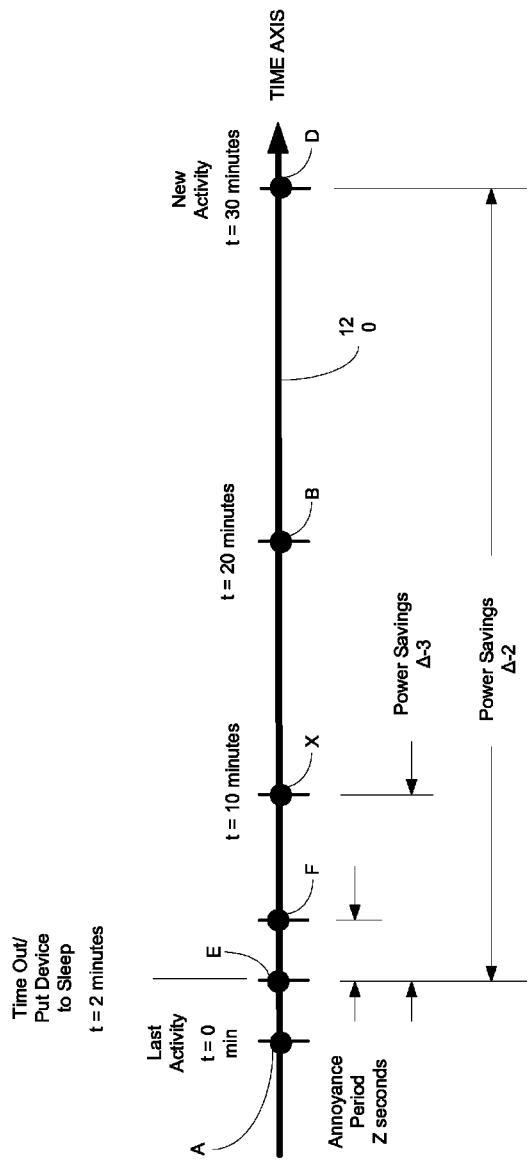
FIG. 1B is a diagram of a timeline illustrating the power savings when a device has a short and aggressive timeout value according to an embodiment of the present disclosure.

FIG. 1B is a diagram of a timeline illustrating the power savings when a device has a shorter timeout value according to an embodiment of the present disclosure. A short and aggressive timeout value can provide larger energy savings, when compared to a large and conservative timeout value, but can irritate the user, especially by causing frequent interruptions during periods of light activity by the user with the device. As shown, timeline 120 illustrates points of activity and inactivity with the device. Similarly marked points in FIGS. 1A and 1B occur at the same time in both timelines 110 an 120 and can be used as points of reference. A short and aggressive timeout value of 2 minutes is associated with the device. At point A, the last activity is shown at time t=0 minutes. At point E, 2 minutes has elapsed from point A without any activity shown by the user with the device. As such, at point E, the display of the device has been put to sleep. Other elements or components of the device may also be put to sleep. At point D, the user interacts with the device, such that new activity has occurred at t=30 minutes. As such, the power savings Δ–2 is approximately 28 minutes, between points E and D, which is significantly longer than Δ–1 associated with a large timeout value.

In another example, point X in both FIGS. 1A and 1B occur at 10 minutes after point A, which denotes the last activity on the device. Point X is associated with a user who is lightly using the device, such as interacting with the device after about 5 to 10 minutes. In the case where the device has a large, conservative timeout value of 20 minutes, as shown in FIG. 1A, there is no energy savings due to activity by the user at point X, after 10 minutes of inactivity, since the device has not been put to sleep. Conversely, where the device has a short and aggressive timeout value of 2 minutes, as shown in FIG. 1B, there is some energy savings associated with activity of the user at point X. The device was put to sleep after 2 minutes, and as such, at point X, after 10 minutes of inactivity, there is a power savings Δ–3 of approximately 8 minutes. This may be significant, especially if the device is a mobile device with limited power, and the user wishes to extend the life of the existing charge on the battery of the device.

Figure 2:
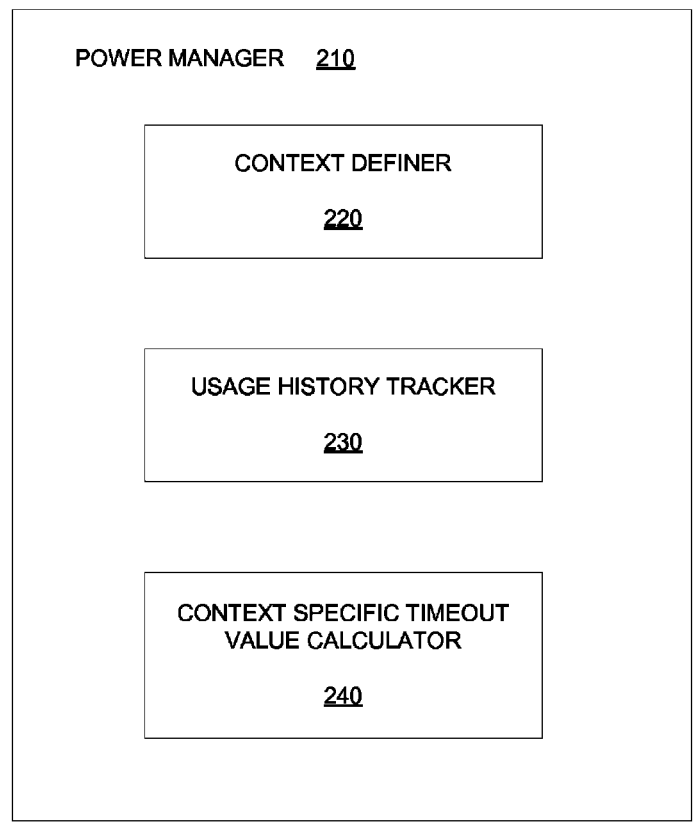
FIG. 2 is a block diagram of a power manager capable of providing context specific power management of a resource according to an embodiment of the present disclosure.

FIG. 2 is a block diagram of a power manager 210 capable of providing context specific power management of a resource according to an embodiment of the present disclosure. In one embodiment, power manager is a computer system capable of providing context specific power management. In some embodiments, power manager 210 is local to the device and/or resource to which power is managed. In other embodiments, power manager 210 is located remotely from the device and/or resource to which power is managed. For instance, power manager 210 may remotely monitor usage history of a device and manage power to that device depending on the current context in which the device is operating.

As shown in FIG. 2, power manager 210 includes a context definer 220. The context in which the device is operating describes the operating characteristics of the device as well as the environment in which the device is operating. The context of a device may change dynamically, especially as the device is moved from one location to another, and the use of the device changes. For instance, a user may be in a coffee shop working off a portable laptop, and is connected through a virtual private network (VPN) back to a work network. Given the current context, the demand on the device may be more intense assuming that the user is performing work through the VPN. A shorter timeout value may be appropriate to extend the useable life of the device. In another case, the same user may be in the same coffee shop using the portable laptop. However, instead of connecting to the VPN, the user is connected to the local Wi-Fi connection, and is casually surfing the internet. In this case, a larger timeout value may be appropriate.

Power manager 210 includes a usage history tracker 230. The usage history of the device is tracked for the various contexts that are encountered and defined by the device. The usage tracker 230 monitors the user's experience in relation to the timeout value for a given context. Specifically, tracker 230 is able to determine whether the user is satisfied with the timeout value or annoyed with the timeout value. The user passively provides feedback indicating the user's experience with the timeout value through interactions with the device in relation to any timeout period or value. The expected user experience associated with a device (e.g., mobile device) may vary among users. For instance, a single model of a mobile device is carried by many users, each of which have different user experiences associated with their corresponding device. In addition, the expected user experience, even for a single user, may vary with time, the environment, or context in which the device is being used.

The timeout value calculator 240 is configured to determine the timeout value which provides the best tradeoff between energy saving and annoyance to the user for a given and current context in which the device is operating. In one embodiment, the timeout value is adaptable to the expectations of the user depending on the context and usage history of the device and user. Specifically, the timeout value is based on the user's tolerance to annoyance caused by the power management policy (e.g., period of annoyance setting, timeout value) for a given context. As such, the power manager 210 is able to dynamically adapt power management settings (e.g. for the display) based on the user context and the usage history of the device and user.

Figure 3:
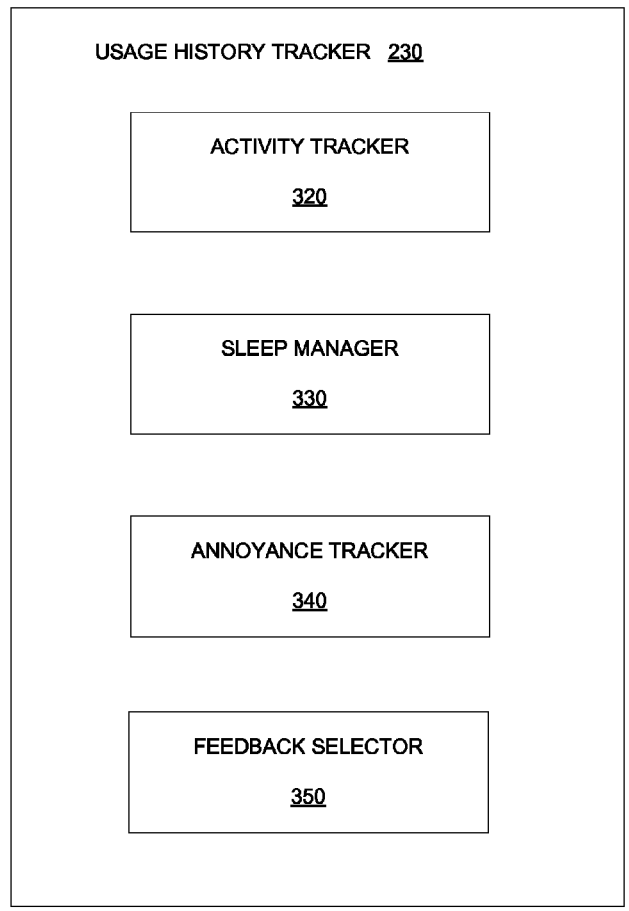
FIG. 3 is a block diagram of a usage history tracker as an element of the power manager of the FIG. 2 configured to determine positive and negative feedback of a user relative to one or more timeout values of a device according to an embodiment of the present disclosure.

FIG. 3 is a block diagram of a usage history tracker 230 included as an element of the power manager 210 of FIG. 2, in one embodiment. Tracker 230 is configured to determine positive and negative feedback of a user relative to one or more timeout values of a device according to an embodiment of the present disclosure. In that manner, a timeout value can be determined for a current use of the device.

Usage history tracker 230 includes an activity tracker 320, which monitors for use of the device. That is, activity tracker 320 determines when the device is actively used, and when it is not actively used. In one embodiment, a time stamp is determined by tracker 320 whenever an event occurs. Periods of activity or inactivity can be determined by monitoring for any interaction of the user with the device. For instance, a keyboard or mouse event will trigger an activity by the user on the device. Other interactions with the device is contemplated within the scope of embodiments, such as movement of the device, touching the display, talking to the device, etc.

Sleep manager 330 uses the information from the activity tracker 320 to determine when the device and/or resource associated with the device should be turned off or put to sleep. Specifically, depending on the timeout value currently associated with the device, the sleep manager 330 shuts off the device and/or resource after no activity has been detected over a timeout period or value.

Annoyance tracker 340 is configured to monitor for activity after the device and/or resource of the device has been put to sleep. Information from the annoyance tracker 340 provides feedback about the user's experience in relation to the current timeout value, as determined by feedback selector 350. Returning to FIGS. 1A and 1B, a variable annoyance period of Z is shown and is monitored by the annoyance tracker. The annoyance period may be set to any time period (e.g., 5 seconds), and is used to determine whether a user is annoyed with the current timeout value. For instance, if the user quickly interacts with the device shortly after the device has been put to sleep, and within the annoyance period Z, this indicates that the user is actively engaged with the device, and is probably annoyed that the device was put to sleep. In some instances, it may even cost more power to turn on the device after being put to sleep, than if the device were left in an "ON" state. On the other hand, if the user does not interact with the device during the annoyance period after the device has been put to sleep, then this indicates the user is not actively engaged with the device, and probably is not annoyed that the device was put to sleep. In this manner, by tracking user activity with the device (e.g., keyboard and mouse interaction), the user passively provides feedback regarding whether he or she is content with the current setting of the timeout value.

Figure 4:
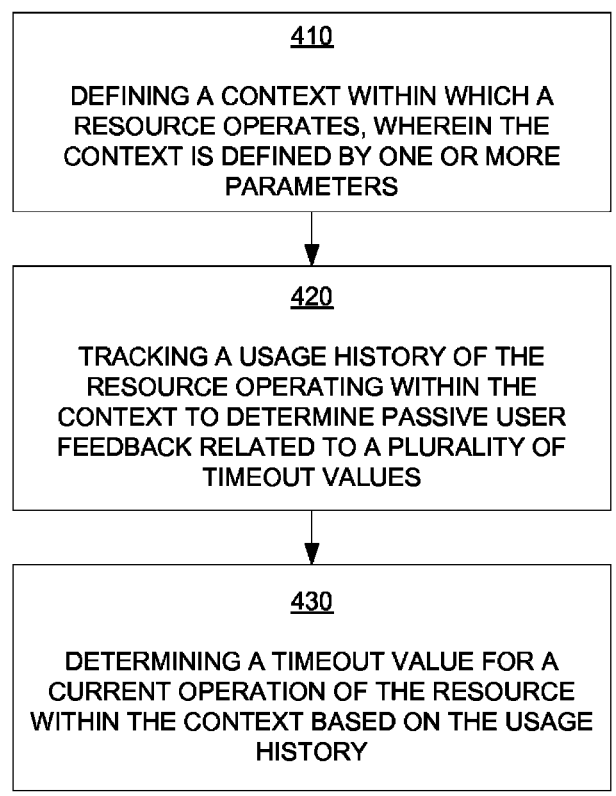
FIG. 4 is a flowchart of a computer-implemented process for context specific power management of a resource according to an embodiment of the present disclosure.

FIG. 4 is a flowchart 400 of a computer-implemented process for context specific power management of a resource according to an embodiment of the present disclosure. For instance, in one embodiment, the process outlined in flowchart 400 is implemented by power manager 210 of FIG. 2 to dynamically adapt power management settings of a device based on user and device context and usage history for that contexts and/or related contexts.

In block 410 a context within which a device and/or a resource of the device operates is defined. The context may be defined by various resource associated parameters, such as network identity or connectivity, power source, power level, power settings, mobility, etc. The context may also be defined by various environmentally associated parameters, such as geo-location of the device, time of day, etc. as will be further discussed in relation to FIGS. 5A and 5B. In one embodiment, the process outlined in block 410 is implemented by the context definer 220 of the power manager 210.

In block 420, a usage history of the device is tracked. More specifically, the usage history is tracked in relation to the context within which the device is operating. The usage history is used to determine passive user feedback related to a plurality of timeout values. For instance, positive and negative feedback is passively or indirectly delivered when the user is actively using the device. In one embodiment, the process outlined in block 420 is implemented by the usage history tracker 230 of the power manager 210.

In block 430 a timeout value for a current operation of the resource is determined based on the context within which the device is operating and the usage history associated with the context. More specifically, a current timeout value is determined based on previous user experiences with a plurality of timeout values for the same or related context. In one embodiment, the process outlined in block 430 is implemented by the timeout value calculator 240 of the power manager 210.

Figure 5A:
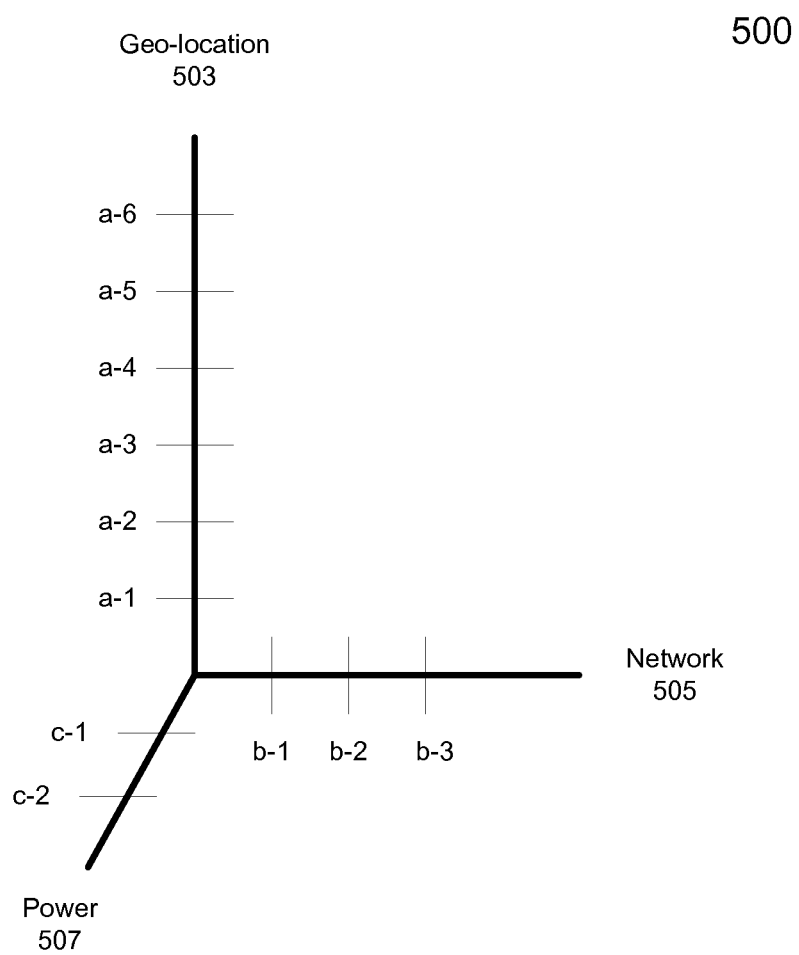
FIG. 5A is a multi-dimensional graph illustrating a plurality of contexts within which a device may operate according to an embodiment of the present disclosure.

Referring now to FIG. 5A, a multi-dimensional graph 500 is shown illustrating a plurality of contexts within which a device may operate according to an embodiment of the present disclosure. As shown, a context is defined by three dimensions 503, 505, and 507, each further defined by a corresponding parameter. Though three dimensions are shown in FIG. 5A, it is contemplated that a context may be defined by one or more dimensions. As previously described, contextual dimensions may be defined by a resource and/or device configuration parameter (network identity, power source, mobility, power level, etc.), or an environmental parameter (location, date, time, etc.). Other dimensions or categories of dimensions are well suited for defining a context as envisioned in embodiments of the disclosure. Further, some parameters may be considered as a mixture between types or categories of dimensions.

Dimensions illustrated in FIG. 5A include a geo-location dimension 503, network connectivity dimension 505, and power dimension 507. Each context associated with the device may be defined by one or more of the dimensions. For instance, the geo-location dimension 503 defines the geographic location of the device, or the perceived or default location of the device. This may be obtained through global positioning satellite (GPS) operations, use of location associated with engaged cell towers, or any other suitable locating process. In some embodiments, it is not necessary to know the precise location of the device, but a general location, such as zip code, city, region, etc. Additionally, the location may be generally identified by category, defining whether the device is at "home," "work," another defined location, or an unknown "other" location. Each of the defined locations is associated with a value, such as a-1, a-2, a-3, etc. For instance, zip code 90210 may be a-1, and zip code 91108 may be a-2.

Further, the network identity or network connectivity dimension 505 defines the network to which the device is connected. For instance, the network identity dimension defines the internet protocol (IP) network that the device is engaging. The device may be physically be at home, but actually connected to a work network using VPN, and as such its correct context would be more reflective of a work environment than a home environment. In some embodiments the combination of IP address and a network gateway is used to identify the network identify. In some embodiments, the network identity is further classified into a public network (e.g., coffee shop network), secure network, "home" network, a "work" network, any other unknown "other" network, etc. As shown in FIG. 5A, the network dimension 505 has at least three values: b-1, b-2, and b-3, which may correspond to a VPN network, a secure network, and a home network.

In addition, the power dimension 507 defines the power source to which the device draws power. For power management, it is important to know whether a device, such as a mobile device, is operating on alternating current (AC) or direct current (DC) battery power, as its primary power source. As shown in FIG. 5A, the power dimension 507 has two entries: c-1 and c-2, corresponding to AC or DC power.

Other dimensions are contemplated in embodiments of the disclosure. For instance, a dimension may include battery level. When using the battery, knowing the battery is critical, as power management decisions may change depending on the level of the remaining battery power. In another example, another dimension may include power settings, which define current power management settings of the device. For instance, a power setting may include the current display timeout value. Another dimension may include mobility, in which the mobility of the device is defined as being static or mobile, as well as incremental stages of mobility.

FIG. 5B is a table 550 illustrating usage history for each of a plurality of contexts for a device according to an embodiment of the present disclosure. For instance, the context definer 220 and timeout value calculator 240 provide values that are included within table 550 for purposes of providing power management of a device and/or a resource associated with the device.

As shown in table 550 a plurality of contexts 560 (e.g., context-(1)-(N)) are defined by context characteristics 570. Each context may be defined by one or more dimensions 1-N, previously introduced in FIG. 5A. As examples, a context dimension may include geo-location, network identity, power source, mobility, etc. Each dimension may further be characterized by varying types. For instance, the geo-location dimension is defined by types a-1 through a-n, which may correspond to various zip codes, or other locations.

As such, context-1 as illustrated in rows 561A-C is defined by various dimensions, such as, a-1, b-2, c-1, . . . , n-1; context-2 as illustrated in row 562 is defined by various dimensions, such as, a-1, b-3, c-2, . . . , n-1; and context-n as illustrated in row 564 is defined by various dimensions, such as, a-5, b-4, c-1, . . . , and n-4. A variation of even one dimension's value will distinguish one context from other contexts.

Also shown in table 550 is usage history 575. For each context, a usage history is monitored that illustrate the user's experience with the device, in relation to various timeout values. As power management is user specific, feedback from the user is obtained to learn and adapt power management strategies from past experiences. As shown, positive and negative feedback is provided for each context. That is, for each instance of a user experience with a timeout value is monitored and recorded.

In one embodiment, each instance of the device being put to sleep is monitored for user experiences to determine positive and negative feedback. For example, an aggressive setting for the display timeout may cause annoyance to the user irritation to the user, and as such the user provides a feedback input by using the keyboard or the mouse to wake the display up as soon as it goes to sleep (or within a short-duration, e.g., 5 seconds). Such feedback are considered "negative" for the power management scheme. On the other hand, if the user does not wake up the display within that short period of time, it is considered a positive feedback.

Total positive and negative feedback are recorded, and tagged with the context in which the feedback was provided. These feedback are then stored in a database called usage history or feedback history. Feedback history is monitored for each of the timeout values implemented within that context. For instance, for context-1 as illustrated in row 561A, positive feedback (20) and negative feedback (10) (corresponding to 33 percent negative feedback) for a sampled timeout value or period of 5 minutes is provided. Other feedback values may be provided for context-1 (shown in rows 561B and 561C) for other timeout values. As another example, for context-2 as illustrated in row 562, positive feedback (45) and negative feedback (5) (corresponding to 10 percent negative feedback) for a sampled timeout value of 15 minutes is provided. Again, other feedback values may be provided for context-2 (not shown) for other timeout values, if available. In still another example, for context-N, as illustrated in row 564, positive feedback (97) and negative feedback (3) (corresponding to 3 percent negative feedback) for a sampled timeout value of 20 minutes is provided. Still other feedback values may be provided for context-N (not shown) for other timeout values, if available.

A typical trend is shown in table 550. For a given context, as the timeout value increases the percentage of negative feedback also conversely decreases. That inverse relationship will vary for every context, and will vary between users. For instance, for context-1, feedback is given for timeout values of 5 minutes, 10 minutes, and 20 minutes. Corresponding percentages of negative feedback is inversely proportional, such that for a timeout value of 5 minutes there is 33 percent negative feedback; for a timeout value of 10 minutes, there is 20 percent negative feedback; and for a timeout value of 20 minutes, there is 1 percent negative feedback.

Figure 6A:
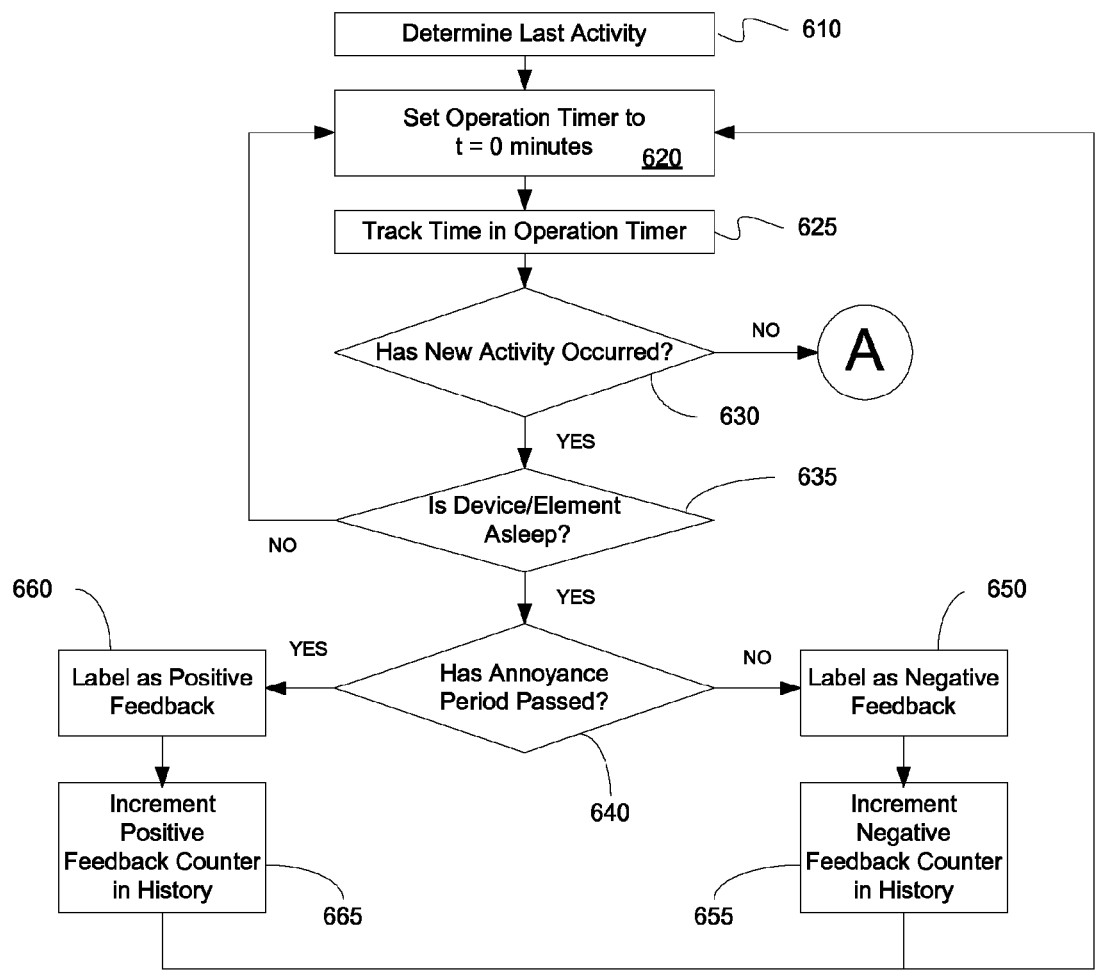
FIG. 6A is a flowchart of a computer-implemented process for monitoring positive and negative feedback of a user relative to one or more timeout values of a device according to an embodiment of the present disclosure.
Figure 6B:
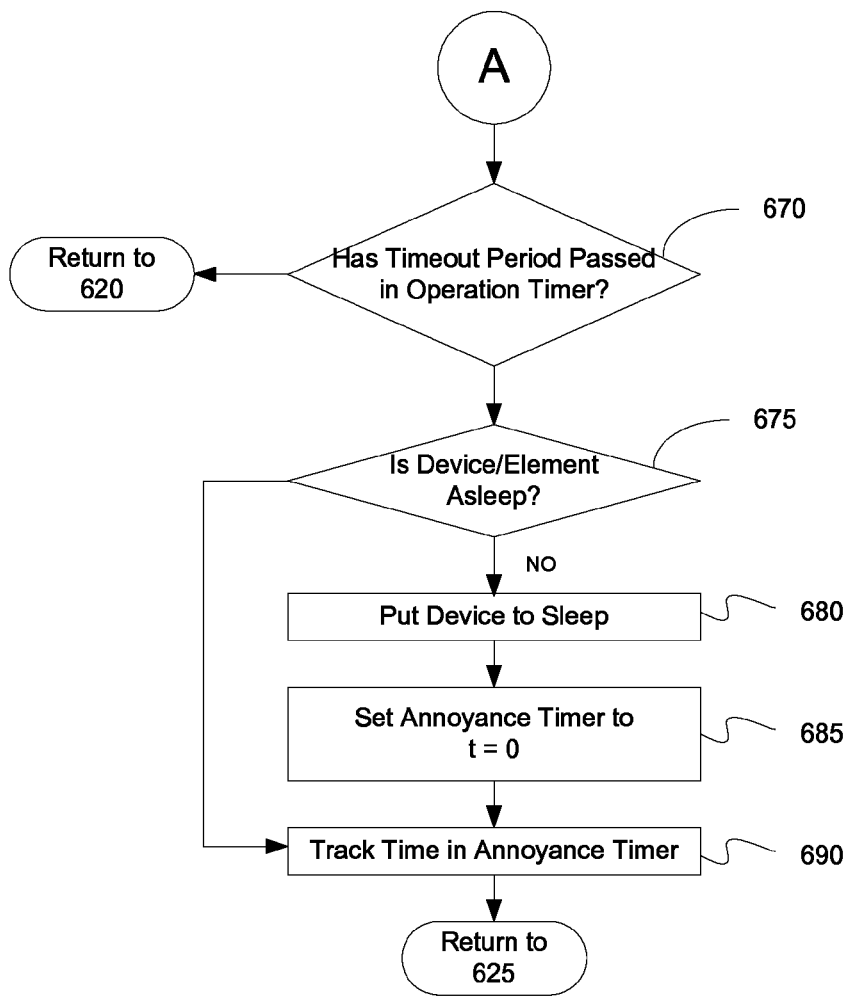
FIG. 6B is a flowchart of a computer-implemented process for tracking an annoyance period after a device has been put to sleep according to an embodiment of the present disclosure.

FIGS. 6A and 6B in combination illustrate the processes implemented for monitoring feedback for a given context under which a device is operating. The processes outlined in FIGS. 6A and 6B are implemented by the usage history tracker 230 of FIG. 3, in one embodiment.

In particular, FIG. 6A is a flowchart 600A of a computer-implemented process for monitoring positive and negative feedback of a user relative to one or more timeout values of a device according to an embodiment of the present disclosure. In particular, the process of flow chart 600A monitors activity by a user to determine the user experience in relation to a timeout value for a given context. In the performance of the process outlined in flowchart 600A, the context is associated with a timeout value that indicates when to shut off or hibernate the device and/or resource of the device. The same or similar process in flowchart 600A is performed to monitor for user feedback given any context within which the device is operating.

At block 610, a last activity of a device and/or a resource of the device is detected. The operation in block 610 is performed by activity tracker 320 in one embodiment. The last activity is also the first activity of the process outlined in flowchart 600A, in one embodiment. Since the device is continuously monitored, any new activity becomes the last known activity and the process continually loops in operation.

At block 620, the operation timer is set to zero. Also, at block 625, the operation timer is run to track the time. That is, the timer is refreshed so that a period of inactivity from the last known active event is monitored. This is important for purposes of determining when to put the device and/or resource of the device to sleep, as will be discussed in relation to FIG. 6B. In one embodiment, the sleep manager 330 manages the operating timer.

At decision block 630, it is determined if any new activity has occurred. In one embodiment, activity tracker 320 monitors for any new activity. If no new activity has occurred, then the process continues to FIG. 6B at transition point A to determine whether the device should be put to sleep. On the other hand, if a new activity has occurred, then the process continues to decision step 635, where it is determined if the device and/or the resource or element of the device is asleep. In one embodiment, the sleep manager 330 determines the activity of the device and/or resource. If not asleep, then the process loops back to block 620 to reset the period of inactivity. This situation is shown at point X in FIG. 1A.

However, if it is determined that the device and/or the resource or element of the device is asleep at block 635, then the process proceeds to decision block 640 to determine if an annoyance period has passed. The process in block 640 is performed by annoyance tracker 340 of FIG. 3, in one embodiment. As previously described, the annoyance period is variable and is used to determine whether a user is annoyed with the current timeout value. In one case, the annoyance period is set to 5 seconds.

If the annoyance period has passed, then the process proceeds to block 660 where a positive feedback is determined. In one embodiment, the feedback selector 350 determines the type of feedback passively expressed by the user. Specifically, since the new activity occurred after the device and/or resource was put to sleep, and after the annoyance period has elapsed, then the user's new activity fell outside of the annoyance period, and the user was not annoyed. In that manner, it is determined that the user in this instance was satisfied with the current timeout value. In particular, in block 660, the user's experience is labeled as positive feedback, which is then recorded in the usage history 575 by incrementing the positive feedback value in block 665. Thereafter, the process loops back to block 620 to reset the period of inactivity.

On the other hand, if the annoyance period has not passed, then the process proceeds to block 650 where a negative feedback is determined. Specifically, since the new activity occurred after the device and/or resource was put to sleep, but before the annoyance period had fully elapsed, then the user's new activity fell within the annoyance period, and the user probably was annoyed. In that manner, it is determined that the user in this instance was not satisfied with the current timeout value. In particular, in block 650, the user's experience is labeled as negative feedback, which is then recorded in the usage history 575 by incrementing the negative feedback value in block 655. Thereafter, the process loops back to block 620 to reset the period of inactivity.

Turning now to FIG. 6B, a flowchart 600B is shown outlining a computer-implemented process for tracking an annoyance period after a device has been put to sleep according to an embodiment of the present disclosure. In particular, the process of flowchart 600B monitors a period of inactivity of a device by a user to determine when to put a device and/or resource of the device to sleep, and further to set and track an annoyance timer. In the performance of the process outlined in flowchart 600B, the context is associated with a timeout value that indicates when to shut off or hibernate the device and/or resource of the device. The same or similar process in flowchart 600B is performed to monitor for periods of inactivity and to set and track an annoyance timer given any context within which the device is operating.

Beginning from transition point A, the process begins at decision block 670 in which it is determined whether a timeout period corresponding to the timeout value has passed according to the operation timer. In one embodiment, the sleep manager 330 monitors the operation timer to check if a period of inactivity has surpassed the timeout period. If the timeout period has not passed, then the process returns to block 625 to continue to track time and wait for any new activity. On the other hand, if the timeout period has passed, then the process proceeds to decision step 675 to determine if the device and/or the resource or element of the device is asleep. In one embodiment, the sleep manager 330 determines the activity of the device and/or resource. If already asleep, then the process proceeds to block 690 to track time in the annoyance timer. On the other hand, if not asleep, then the device and/or resource of the device is put to sleep at block 680 in order to conserve power dedicated to the device and/or resource. That is, power is conserved when a corresponding timeout period has elapsed in relation to the last activity. In one embodiment, the sleep manager 330 coordinates the sleeping operation.

In addition, once the device is put to sleep, embodiments of the present disclosure monitors a period of annoyance to receive information related to the user's experience with regards to any current implementation of a timeout value. In one embodiment, the annoyance tracker 340 sets and monitors any annoyance timer. As such, at block 685, an annoyance timer is set to zero. That is, the annoyance period is monitored to check if the user interacts with the device during the short annoyance period, as previously discussed. In addition, at block 690, time is tracked in the annoyance timer. Thereafter, the process returns to block 625 to continue to track time and wait for any new activity.

Figure 7A:
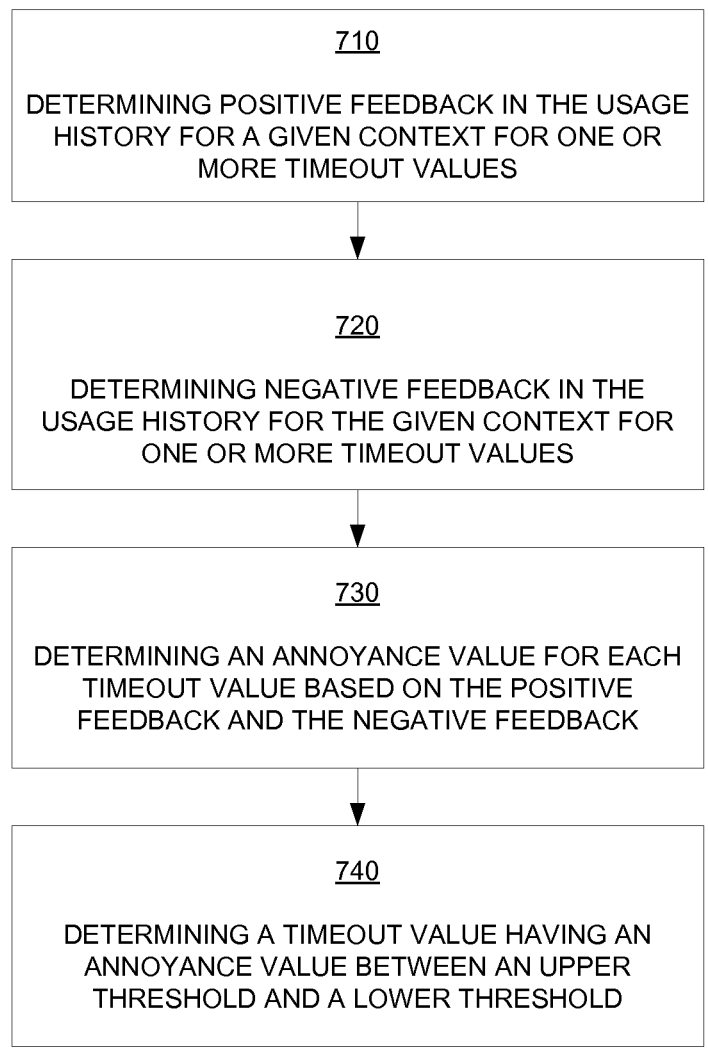
FIG. 7A is a flow chart of a computer-implemented process for determining a timeout value for a given context when delivering context specific power management of a resource according to an embodiment of the present disclosure.

FIG. 7A is a flow chart 700A of a computer-implemented process for determining a timeout value when delivering context specific power management of a resource according to an embodiment of the present disclosure. The operations performed in flow chart 700A provide a more detailed process for determining a timeout value in block 430 of FIG. 4, and as such can be performed by the timeout value calculator 240, in another embodiment.

The timeout value is determined for a given context within which the device is operating. The dynamic calculation of a timeout value takes into account changing conditions affecting the device, and as such embodiments of the present disclosure are able to adaptively adjust the timeout value according to current conditions. Specifically, embodiments of the present disclosure determine a current timeout value for a device based on the usage history of the device by a user within the same or similar contexts.

In block 710, positive feedback is determined in the usage history for a plurality of timeout values. In particular, for a given context, user feedback is analyzed for every past timeout value used as a configuration of the device. As such, for every timeout value used positive feedback is noted. In one embodiment, the instances of positive feedback is counted. For example, referring to FIG. 5B, positive feedback for context-1 is stored for various timeout values in rows 561A-C.

In block 720, negative feedback is determined in the usage history for a plurality of timeout values. In particular, for the same given context, user feedback is analyzed for every past timeout value used as a configuration of the device. As such, for every timeout value used, negative feedback is noted. In one embodiment, the instances of negative feedback is counted. For example, referring to FIG. 5B, negative feedback for context-1 is stored for various timeout values in rows 561A-C.

In block 730, an annoyance value is determined for each timeout value. The annoyance value is based on the positive feedback and the negative feedback collected and analyzed for each timeout value. The annoyance value gives a degree of annoyance associated with the past use of the device (e.g., by a user) for a particular timeout value as applied within a given context.

In one embodiment, the annoyance value is determined by calculating the percentage of negative feedback instances in relation to all feedback instances (e.g., positive and negative feedback). Equation 1 shows the calculation of the annoyance value for a given timeout value for a given context.

$$\frac{\text{Annoyance Value}}{\text{(timeout value)}} = \frac{\text{Total negative feedback}}{\text{Total positive and negative feedback}}$$

For instance, considering context-1 in FIG. 5B, the annoyance value is 33 percent for a timeout value of 5 minutes in row 561-A, the annoyance value is 20 percent for a timeout value of 10 minutes in row 561-B, and the annoyance value is 10 percent for a timeout value of 20 minutes in row 561-C.

In block 740, a timeout value is determined based on the annoyance values for each of the timeout values for a given context. In particular, the timeout value that is selected has an annoyance value that fits within a range of acceptable annoyance values. That is, the timeout value is associated with a fraction of negative feedback in the usage history that lies between two user configurable thresholds. For instance, the timeout value may have an annoyance value between an upper threshold and a lower threshold. The upper threshold denotes the highest tolerance level of the annoyance induced by power management (e.g., display power management) for a user. The lower threshold denotes the extent of the energy saving attainable. The timeout value is increased or decreased to balance the trade-off between energy savings and annoyance to the user for a given context. Selection of the timeout value is illustrated in FIG. 8, in one embodiment.

Figure 8:
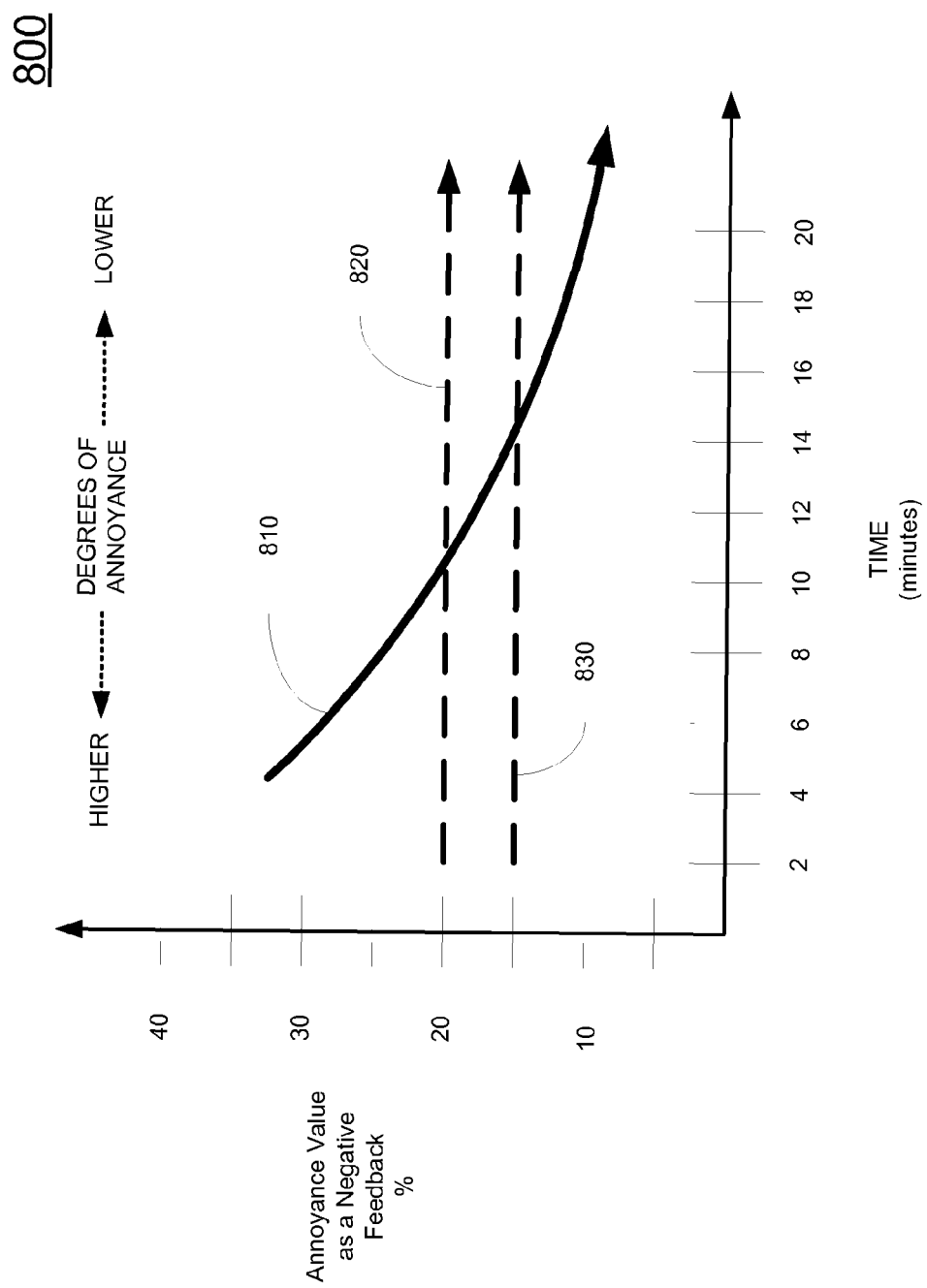
FIG. 8 is a chart illustrating the relationship of negative feedback to timeout values for a device configured to implement context specific power management of a resource according to an embodiment of the present disclosure.

FIG. 8 is a chart 800 illustrating the relationship of negative feedback to timeout values for a device configured to implement context specific power management of a resource according to an embodiment of the present disclosure. For purposes of illustration, the plotted values in FIG. 8 may represent in general the user experience of a device operating within context-1 over a plurality of timeout values with feedback information given in rows 561A-C of FIG. 5B. Line 810 shows annoyance values plotted for timeout values from 0 to 20 minutes, for context-1.

As shown, line 820 represents an upper threshold for an annoyance value. Also, line 830 represents a lower threshold for an annoyance value. The upper and lower thresholds may vary to adjust the tolerable range of acceptable annoyance values for a given user, device, contexts, combinations of the aforementioned, etc. As a result, a range of tolerable annoyance values that are acceptable lies between the upper threshold and the lower threshold. By plotting annoyance values for context-1 for a plurality of timeout values, it is possible to determine timeout values with annoyance values that lie within the tolerable range between the upper and lower thresholds. For example, timeout values from about 11 minutes to 14 minutes have annoyance values within the tolerable range. As such, any timeout value from 11-14 minutes may be selected as the current configured timeout value for the device. For instance, an average of acceptable values may be selected in one embodiment.

Figure 7B:
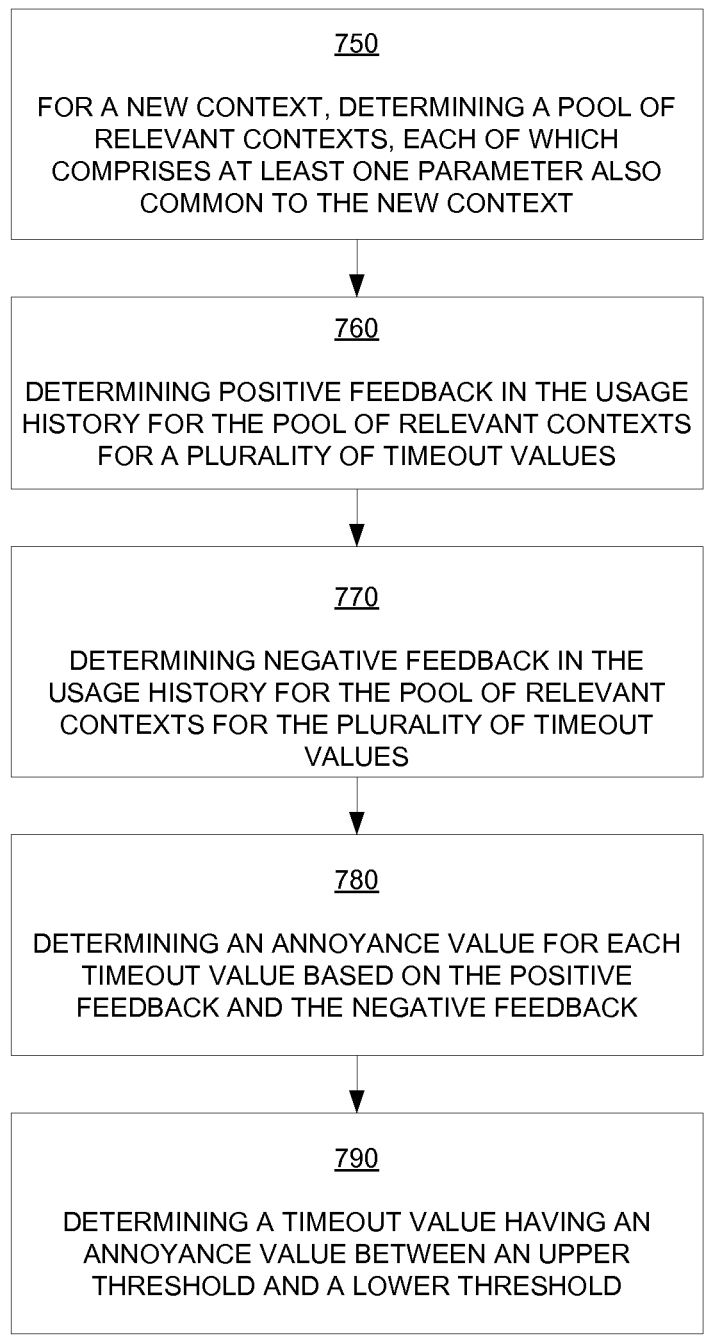
FIG. 7B is a flowchart of a computer-implemented process for determining a timeout value for a new context when delivering context specific power management of a resource according to an embodiment of the present disclosure.

Turning now to FIG. 7B, a flowchart 700B is shown of a computer-implemented process for determining a timeout value for a new context when delivering context specific power management of a resource according to an embodiment of the present disclosure. The operations performed in flow chart 700B determining a timeout value in block 430 of FIG. 4 for new contexts, and as such can be performed by the timeout value calculator 240, in another embodiment.

As described before, contexts are defined by one or more dimensional characteristics. Within each dimension, further characterization may be utilized to describe the context. For instance, one dimension may be a network identity, in which parameters a-1 defines a VPN network, a-2 defines a public network, etc. In another instance, one dimension may be power supply, in which parameter b-1 defines AC power, and b-2 defines DC power, or battery power.

In block 750, given a new context comprising at least one dimensional characteristic, a pool of relevant contexts is determined. That is, the new context is defined by parameters associated with dimensions and characteristics. The combination of parameters is new, however, other similar contexts may share one or more common parameters with the new context. For instance, each relevant context comprises at least one parameter that is also common to the new context.

For example, FIG. 7C is a chart 700C illustrating timeout values and feedback for one or more contexts for purposes of determining a timeout value for a new context, according to an embodiment of the present disclosure. For purposes of ease and illustration, contexts defined by two dimensions are shown. A geo-location dimension includes various sub characteristics or types including work, home, and other. The "other" type is associated with the new context. Another dimension includes network identity, with various sub characteristics or types including VPN or personal network.

In FIG. 7C, row 799 shows a new context defined by two dimensions: 1) an unknown or new geo-location "other"; and 2) a VPN network identity. Table 700C contains feedback and timeout values for a variety of contexts, some of which are relevant to the new context. As shown, relevant contexts to the new context are shown in rows 793 and 795, since they have a common parameter: work VPN. The context in row 791 is not relevant since it does not include types or parameters common with the new context. The usage history (positive and negative feedback for corresponding timeout values) for relevant contexts is used to determine a current timeout value for the new context. For instance, the positive and negative feedback values in rows 793 and 795 are used to determine the timeout value for the new context.

In block 760, positive feedback is determined in the usage history for a plurality of timeout values for the relevant contexts. In particular, for the plurality of relevant contexts, user feedback is analyzed for every past timeout value used as a configuration of the device. As such, for every timeout value used, positive feedback is noted. In one embodiment, the instances of positive feedback is counted.

In block 770, negative feedback is determined in the usage history for a plurality of timeout values for the relevant contexts. In particular, for the relevant contexts, user feedback is analyzed for every past timeout value used as a configuration of the device. As such, for every timeout value used negative feedback is noted. In one embodiment, the instances of negative feedback is counted.

In block 780, an annoyance value is determined for each timeout value. The annoyance value is based on the positive feedback and the negative feedback collected and analyzed for each timeout value associated with the relevant contexts. The annoyance value gives a degree of annoyance associated with the past use of the device (e.g., by a user) for a particular timeout value as applied within a given context. In one embodiment, the calculation of the annoyance value for every timeout value is similar in operation to the calculation of the annoyance value performed in block 730 of FIG. 7A.

In block 790, a timeout value is determined based on the annoyance values for each of the timeout values associated with the pool of relevant contexts. In particular, the timeout value that is selected has an annoyance value that fits within a range of acceptable or tolerable annoyance values. For instance, the timeout value may have an annoyance value between an upper threshold and a lower threshold. In one embodiment, the calculation of the timeout value is similar in operation to the calculation of a timeout value performed in block 740 of FIG. 7A.

Figure 9:
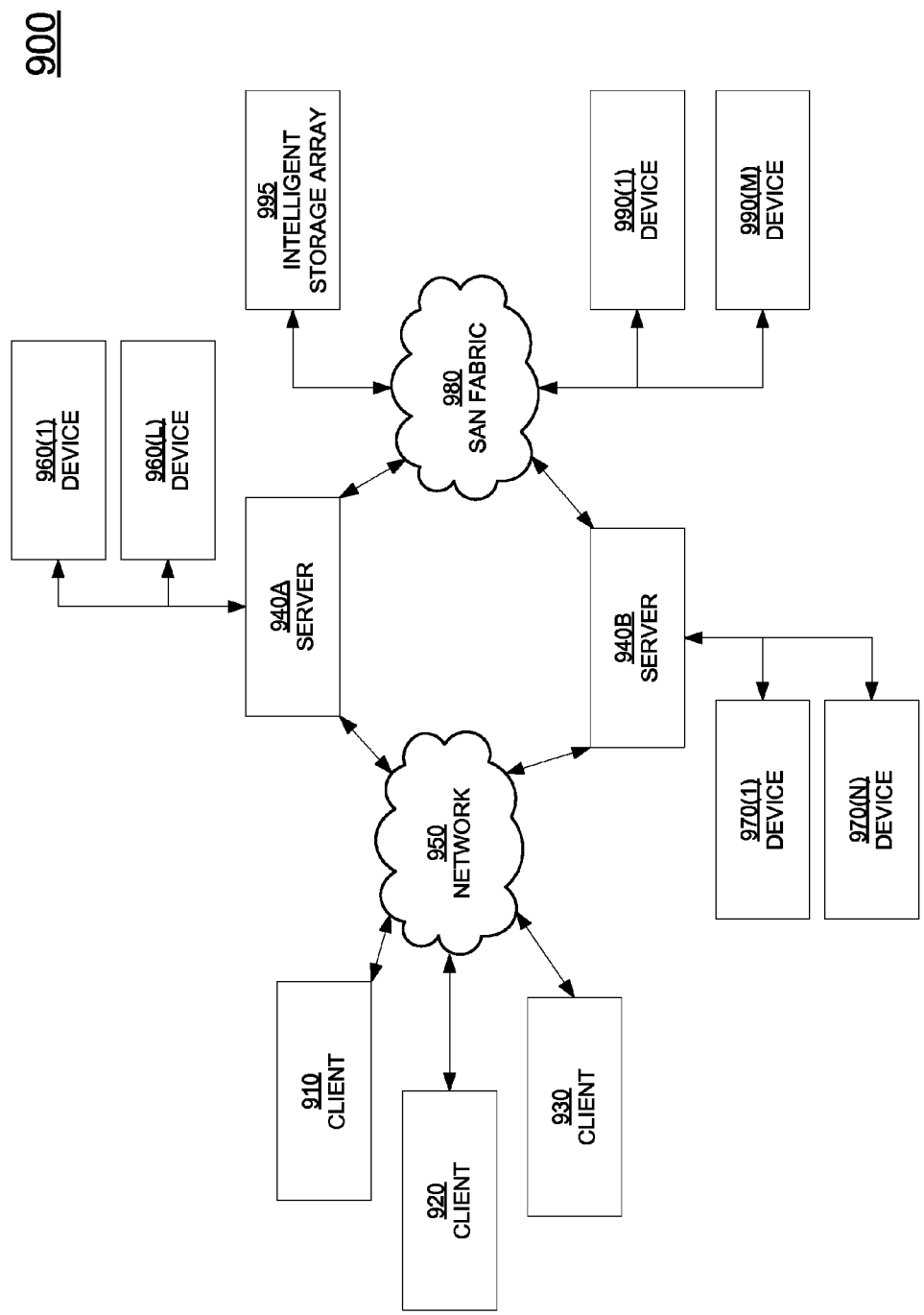
FIG. 9 is a block diagram depicting a network architecture in accordance with one embodiment of the present disclosure.

It is appreciated that the present application disclosing systems and methods for context specific power management of computing resources, such as those found on mobile devices, can be implemented as part of a variety of environments. For example, context specific power management systems and methods can be implemented as part of a distributed computing environment, a cloud computing environment, a virtual environment, a client server environment, etc. In one embodiment, a context specific power management method (e.g., context specific power management of a resource method 400, etc.) can be implemented on a network. FIG. 9 is a block diagram depicting a network architecture 900 in which client system 910, 920, and 930, as well as servers 940A and 940B (e.g., storage or computational servers) (any of which can be implemented using computer system 1000), are coupled to a network 950. Server 940A is further depicted as having devices 960 (1)-(L) (e.g., storage devices) directly attached, and server 940B is depicted with devices 970 (1)-(L) (e.g., storage devices) directly attached. Servers 940A and 940B are also communicatively coupled to SAN (storage area network) fabric 980, although coupling to a storage area network is not required for operation of the various embodiments of the disclosure. SAN fabric 980 supports access to devices 990 (1)-(M) (e.g., storage devices) by servers 940A and 940B, and so by client system 910, 920, and 930 via network 950. Intelligent storage array 995 is also shown as an example of a specific storage device accessible via SAN fabric 980. In one embodiment, a system for implementing context specific power management of computing resources is included in one or more of client 910, 920, and 930 and/or one or more of server 940A and 940B, and can be used to manage power to local and/or remote resources. It is appreciated that present systems and methods are compatible with a variety of implementations. For example, portions of information and instructions associated with the implementation of context specific power management of computing resources can be distributed in various nodes and/or devices (e.g., clients and servers) in network architecture 900.

Figure 10:
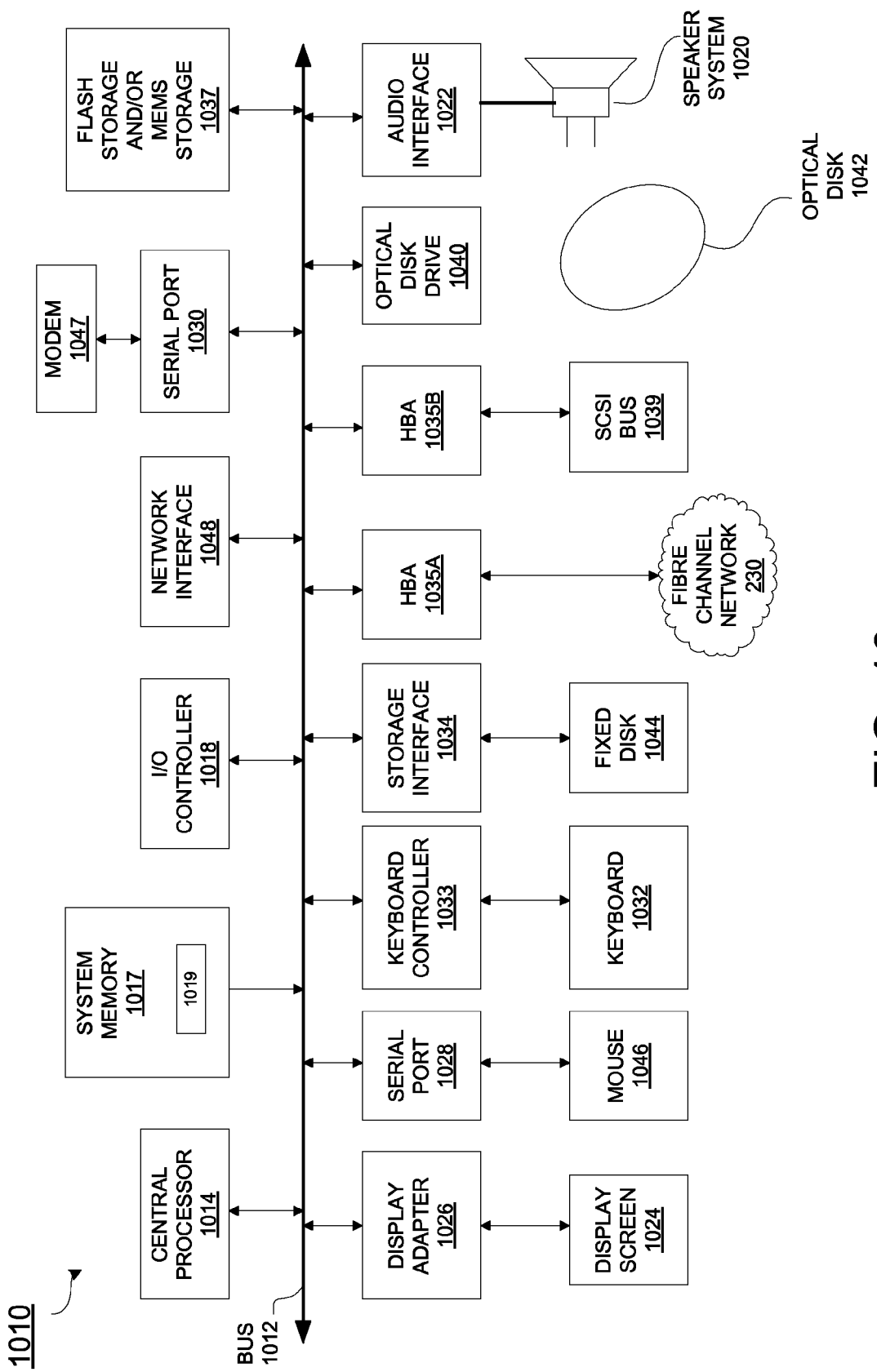
FIG. 10 depicts a block diagram of an exemplary computer system suitable for implementing the present methods in accordance with one embodiment of the present disclosure.

FIG. 10 depicts a block diagram of a computer system 1010 suitable for implementing embodiments of the present disclosure. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, smart phones, mobile devices, or any other computing system or device. In its basic configuration, computing system 1010 may include at least one processor 1014 and a system memory 116.

In the discussion to follow, various and numerous components and elements are described. Various combinations and subsets of those components can be used to implement the devices mentioned in conjunction with FIGS. 2, 3, and 9. For example, the power manager 210, client 910, client 920, client 930, server 940A, server 940B, and components contained therein, may each be a full-function computer system that employs many if not all of the features of the computer system 1010, or they may utilize only the subset of those features needed to support the functionality provided by these devices. For example, servers may not need a keyboard or display, and may execute a relatively sparse operating system that supports the functionality of data storage and data access and the management of such functionality.

In the example of FIG. 10, the computer system 1010 includes a bus 1012 which interconnects major subsystems of the computer system. These subsystems include a central processor 1014; a system memory 1017; an input/output controller 1018; an external audio device, such as a speaker system 1020 via an audio output interface 1022; an external device, such as a display screen 1024 via display adapter 1026; serial ports 1028 and 1030; a keyboard 1032 (interfaced with a keyboard controller 1033); a storage interface 1034; a floppy disk drive 1037 operative to receive a floppy disk 1038; a host bus adapter (HBA) interface card 1035A operative to connect with a Fibre Channel network 1090; an HBA interface card 1035B operative to connect to a SCSI bus 1039 (alternatives to SCSI include Integrated Development Environment (IDE) and Serial Advanced Technology Attachment (SATA)); and an optical disk drive 1040 operative to receive an optical disk 1042. Also included are a mouse 1046 (or other point-and-click device, coupled to bus 1012 via serial port 1028); a modem 1047 (coupled to bus 1012 via serial port 1030); and a network interface 1048 (coupled directly to bus 1012). The modem 1047, network interface 1048 or some other method can be used to provide connectivity to the network 950 of FIG. 9, or any other network.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the example embodiments described and/or illustrated herein. For example, processor 1014 may perform and/or be a means for performing, either alone or in combination with other elements, one or more of the determining, using implementing, tracking, defining, and monitoring described herein. Processor 1014 may also perform and/or be a means for performing any other steps, methods or processes described and/or illustrated herein.

The bus 1012 of FIG. 10 allows data communication between the central processor 1014 and system memory 1017. System memory 1017 generally represents any type or form of volatile or non-volatile storage device or medium capable of storing data and/or other computer-readable instructions. Examples of system memory 1017 include, without limitation, ROM or flash memory (neither shown), and RAM (not shown), or any other suitable memory device, as previously noted. The RAM is generally the main memory into which the operating system and application programs are loaded. The ROM or flash memory can contain, among other code, the Basic Input-Output System (BIOS) which controls basic hardware operation such as the interaction with peripheral components. In one embodiment, instructions for performing context specific power management of computing resources (similar to power management method 400, etc.) are stored in one or more memories of computer system 1000 (e.g., in memory location 1019). In one embodiment, a power manager stored in memory location 1019 is similar to power manager 210 of FIG. 2.

Applications resident in the computer system 1010 are generally stored on and accessed via a computer-readable storage medium, such as a hard disk drive (e.g., the fixed disk 1044), an optical drive (e.g., the optical drive 1040), a floppy disk unit 1037, or other storage medium. Applications can be in the form of electronic signals modulated in accordance with the application and data communication technology when accessed via the network modem 1047 or the interface 1048. All or a portion of the computer program stored on the computer-readable medium may then be stored in system memory 1017 and/or various portions of storage devices 1044, 1037, etc. When executed by processor 1014, a computer program loaded into computing system 1010 may cause processor 1014 to perform and/or be a means for performing the functions of the example embodiments described and/or illustrated herein. Additionally or alternatively, the example embodiments described and/or illustrated herein may be implemented in firmware and/or hardware. For example, computing system 1010 may be configured as an application specific integrated circuit (ASIC) adapted to implement one or more of the embodiments disclosed herein.

Continuing with reference to FIG. 10, storage interface 1034, as with the other storage interfaces of computer system 1010, can connect to a standard computer-readable storage medium for storage and/or retrieval of information, such as a fixed disk drive 1044. The fixed disk drive 1044 may be a part of the computer system 1010, or it may be separate and accessed through other interface systems. The modem 1047 may provide a direct connection to a remote server via a telephone link or to the Internet via an internet service provider (ISP). The network interface 1048 may provide a direct connection to a remote server via a direct network link to the Internet via a POP (point of presence). The network interface 1048 may provide such a connection using wireless techniques, including digital cellular telephone connection, Cellular Digital Packet Data (CDPD) connection, digital satellite data connection, or the like.

Many other devices or subsystems (not shown in FIG. 10) may be connected in a similar manner (e.g., document scanners, digital cameras and so on). Conversely, all of the devices shown FIG. 10 need not be present to practice the present disclosure. The devices and subsystems can be interconnected in different ways from that shown in FIG. 10. Computing system 1010 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The operation of a computer system such as that shown in FIG. 10 is readily known in the art and is not discussed in detail in this application. Code to implement embodiments of the present disclosure can be stored in computer-readable storage media such as one or more of the system memory 1017, fixed disk 1044, optical disk 1042, or floppy disk 1038. The operating system provided on the computer system 1010 may be MS-DOS®, MS-WINDOWS®, OS/2®, UNIX®, Linux®, or another known operating system. For example, the system memory 1017 is shown storing instructions for implementing context specific power management of computing resources in accordance with various embodiments of the present disclosure. However, those instructions can also be stored in computer readable storage media such as one or more of the system memory 1017, fixed disk 1044, optical disk 1042, or floppy disk 1038. It should be further noted, that in an embodiment, the computer system 1010 can have some, most, or all of its functionality supplanted by a distributed computer system having a large number of dispersed computing nodes, as would be the case where the functionality of the computer system 1010 is partly or wholly executed using a cloud computing environment.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1000, modem 1047, network interface 1048, or some other method can be used to provide connectivity from each of the client computer system 910, 920, and 930 to network 950. Client systems 910, 920, and 930 are able to access information on network addressable storage using, for example, a transfer coordination component, a web browser, or other client software (not shown). Such a client allows client system 910, 920, and 930 to access data hosted by servers 940A or 940 B, or one of the corresponding storage servers. FIG. 10 depicts the use of a network such as, the internet for exchanging data, but the present disclosure is not limited to the internet or any particular network based environment.

Thus, according to embodiments of the present disclosure, power management of a device or resources of a device is dynamically adapted based on the context within which the device is operating, and from a history of feedback relating user experiences and timeout values. In one embodiment, display power management is dynamically adapted based on the current context and usage history of the device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A non-transitory computer-readable storage medium having stored thereon, computer-executable instructions that, when executed by a computer system causes the computer system to perform a method, comprising:
    defining a context within which a resource operates, wherein said context is defined by one or more parameters;
    tracking a usage history of said resource operating within said context to determine passive user feedback related to a plurality of timeout values; and
    determining a timeout value for a current operation of said resource within said context based on said usage history.

2. The computer-readable storage medium of claim 1, wherein said tracking a usage history in said method comprises:
    determining a last activity of said resource;
    conserving power dedicated to said resource when a corresponding timeout period has elapsed in relation to said last activity;
    tracking an annoyance period after said resource is sleeping; and
    determining a positive feedback when a new activity occurs after said annoyance period has elapsed.

3. The computer-readable storage medium of claim 1, wherein said tracking a usage history in said method comprises:
    determining a last activity of said resource;
    conserving power dedicated to said resource when a corresponding timeout period has elapsed in relation to said last activity;
    tracking an annoyance period after said resource is sleeping; and
    determining a negative feedback when a new activity occurs before said annoyance period has elapsed.

4. The computer-readable storage medium of claim 1, wherein said determining a timeout value in said method comprises:
    determining positive feedback in said usage history for a plurality of timeout values;
    determining negative feedback in said usage history for said plurality of timeout values;
    determining an annoyance value for each timeout value based on said positive feedback and said negative feedback; and
    determining a timeout value having an annoyance value between an upper threshold and a lower threshold.

5. The computer-readable storage medium of claim 4, wherein said determining an annoyance value in said method comprises:
    for a given timeout value, determining a percentage of negative feedback within all feedback for said given timeout value.

6. The computer-readable storage medium of claim 1, wherein in said method a parameter of said one or more parameters comprises a resource parameter or environmental parameter taken essentially from a group consisting of: mobility; network connectivity; Wi-Fi card access; power; time; and geo-location.

7. The computer-readable storage medium of claim 1, wherein said defining a context in said method comprises:
    defining said context for a device including a display as said resource.

8. The computer-readable storage medium of claim 1, wherein said method further comprises:
    for a new context, determining a pool of relevant contexts, each of which comprises at least one parameter also common to said new context;
    determining positive feedback in said usage history for said pool of relevant contexts for a plurality of timeout values;
    determining negative feedback in said usage history for said pool of relevant contexts for said plurality of timeout values;
    determining an annoyance value for each timeout value based on said positive feedback and said negative feedback; and
    determining a timeout value having an annoyance value between an upper threshold and a lower threshold.

9. A computer system comprising:
    a processor; and
    memory coupled to said processor and having stored therein instructions that, if executed by said computer system, cause said computer to execute a method comprising:
        defining a context within which a resource operates, wherein said context is defined by one or more parameters;
        tracking a usage history of said resource operating within said context to determine passive user feedback related to a plurality of timeout values; and
        determining a timeout value for a current operation of said resource within said context based on said usage history.

10. The computer system of claim 9, wherein said tracking a usage history in said method comprises:
    determining a last activity of said resource;
    conserving power dedicated to said resource when a corresponding timeout period has elapsed in relation to said last activity;
    tracking an annoyance period after said resource is sleeping; and
    determining a positive feedback when a new activity occurs after said annoyance period has elapsed.

11. The computer system of claim 9, wherein said tracking a usage history in said method comprises:
    determining a last activity of said resource;
    conserving power dedicated to said resource when a corresponding timeout period has elapsed in relation to said last activity;
    tracking an annoyance period after said resource is sleeping; and
    determining a negative feedback when a new activity occurs before said annoyance period has elapsed.

12. The computer system of claim 9, wherein said determining a timeout value in said method comprises:
    determining positive feedback in said usage history for a plurality of timeout values;
    determining negative feedback in said usage history for said plurality of timeout values;
    determining an annoyance value for each timeout value based on said positive feedback and said negative feedback; and
    determining a timeout value having an annoyance value between an upper threshold and a lower threshold.

13. The computer system of claim 12, wherein said determining an annoyance value in said method comprises:
for a given timeout value, determining a percentage of negative feedback within all feedback for said given timeout value.

14. The computer system of claim 9, wherein in said method a parameter of said one or more parameters comprises a resource parameter or environmental parameter taken essentially from a group consisting of: mobility; network connectivity; Wi-Fi card access; power; time; and geo-location.

15. The computer system of claim 9, wherein said defining a context in said method comprises:
defining said context for a device including a display as said resource.

16. The computer system of claim 9, wherein said method further comprises:
for a new context, determining a pool of relevant contexts, each of which comprises at least one parameter also common to said new context;
determining positive feedback in said usage history for said pool of relevant contexts for a plurality of timeout values;
determining negative feedback in said usage history for said pool of relevant contexts for said plurality of timeout values;
determining an annoyance value for each timeout value based on said positive feedback and said negative feedback; and
determining a timeout value having an annoyance value between an upper threshold and a lower threshold.

17. A computer implemented method for power management, comprising:
defining a context within which a resource operates, wherein said context is defined by one or more parameters;
tracking a usage history of said resource operating within said context to determine passive user feedback related to a plurality of timeout values; and
determining a timeout value for a current operation of said resource within said context based on said usage history.

18. The method of claim 17, wherein said tracking a usage history comprises:
determining a last activity of said resource;
conserving power dedicated to said resource when a corresponding timeout period has elapsed in relation to said last activity;
tracking an annoyance period after said resource is sleeping;
determining a positive feedback when a new activity occurs after said annoyance period has elapsed; and
determining a negative feedback when said new activity occurs before said annoyance period has elapsed.

19. The method of claim 17, wherein said determining a timeout value comprises:
determining positive feedback in said usage history for a plurality of timeout values;
determining negative feedback in said usage history for said plurality of timeout values;
determining an annoyance value for each timeout value based on said positive feedback and said negative feedback; and
determining a timeout value having an annoyance value between an upper threshold and a lower threshold.

20. The method of claim 17, further comprising:
for a new context, determining a pool of relevant contexts, each of which comprises at least one parameter also common to said new context;
determining positive feedback in said usage history for said pool of relevant contexts for a plurality of timeout values;
determining negative feedback in said usage history for said pool of relevant contexts for said plurality of timeout values;
determining an annoyance value for each timeout value based on said positive feedback and said negative feedback; and
determining a timeout value having an annoyance value between an upper threshold and a lower threshold.

* * * * *